US008843663B2

(12) United States Patent
Chiu et al.

(10) Patent No.: US 8,843,663 B2
(45) Date of Patent: Sep. 23, 2014

(54) DATA TRANSMISSION DEVICE AND METHOD FOR MERGING MULTIPLE COMMANDS

(71) Applicants: Ming-Hui Chiu, New Taipei (TW); Chia-Hsin Chen, New Taipei (TW)

(72) Inventors: Ming-Hui Chiu, New Taipei (TW); Chia-Hsin Chen, New Taipei (TW)

(73) Assignee: ASMedia Technology, Inc., New Taipei (TW)

( * ) Notice: Subject to any disclaimer, the term of this patent is extended or adjusted under 35 U.S.C. 154(b) by 59 days.

(21) Appl. No.: 13/662,566

(22) Filed: Oct. 29, 2012

(65) Prior Publication Data

US 2013/0132612 A1 May 23, 2013

(30) Foreign Application Priority Data

Nov. 18, 2011 (TW) .............................. 100142254 A

(51) Int. Cl.
G06F 3/06 (2006.01)
G06F 3/00 (2006.01)
G06F 13/12 (2006.01)

(52) U.S. Cl.
CPC ....................................... *G06F 3/00* (2013.01)
USPC ............. 710/5; 710/2; 710/8; 710/11; 710/15

(58) Field of Classification Search
None
See application file for complete search history.

(56) References Cited

U.S. PATENT DOCUMENTS

| 7,237,094 B2 | 6/2007 | Curran et al. |
| 7,802,076 B2 | 9/2010 | Almog et al. |
| 2004/0193774 A1 | 9/2004 | Iwata et al. |
| 2007/0079044 A1* | 4/2007 | Mandal et al. ................. 710/310 |
| 2009/0222644 A1 | 9/2009 | Inoue et al. |

FOREIGN PATENT DOCUMENTS

| CN | 101196850 | 6/2008 |
| TW | 200941215 | 10/2009 |

OTHER PUBLICATIONS

"Office Action of Taiwan Counterpart Application", issued on Feb. 18, 2014, p. 1-p. 6.

* cited by examiner

*Primary Examiner* — Scott Sun
(74) *Attorney, Agent, or Firm* — Jianq Chyun IP Office

(57) ABSTRACT

A data transmission device and a command merging method for data transmission are provided. The data transmission device includes a command register and a command merging unit. The command register receives and temporary storages a plurality of original commands, wherein the original commands include a plurality of memory blocks. When the command merging unit judges these memory blocks of the original commands to be a continuous memory block, the command merging unit merges the original commands into a merging command, and transmits the merging command to a peripheral device. Thus, the multiple commands send by the host can be analyzed and merged by the data transmission device to decrease a number of the commands to be proceed by the peripheral device, so as to speed up a command processing time of the peripheral device efficiently.

14 Claims, 5 Drawing Sheets

DATA TRANSMISSION DEVICE AND METHOD FOR MERGING MULTIPLE COMMANDS

CROSS-REFERENCE TO RELATED APPLICATION

This application claims the priority benefit of Taiwan application serial no. 100142254, filed on Nov. 18, 2011. The entirety of the above-mentioned patent application is hereby incorporated by reference herein and made a part of this specification.

BACKGROUND

1. Technical Field

The disclosure relates to a data transmission method. Particularly, the disclosure relates to a data transmission device and a method for merging multiple commands.

2. Related Art

FIG. 1 is a schematic diagram illustrating a host 100 and a peripheral device 110. As shown in FIG. 1, the host 100 (for example, a computer device) and the peripheral device 110 are generally connected through a data transmission interface. In order to use a function of the peripheral device 110 (for example, to access digital information stored in the peripheral device 110), an operating system of the host 100 sends an command to the peripheral device 110 through collaboration of related driving programs and hardware, so as to use the related function of the peripheral device 110.

When the host 100 sends a plurality of commands to the peripheral device 110 within a short time, these commands form a queue to wait for the peripheral device 110 to process. The peripheral device 110 generally determines a processing sequence of these commands according to a transmission sequence thereof or determines the processing sequence by itself, so as to sequentially perform data access. However, when the commands sent by the host 100 are excessive to result in a long queue, the peripheral device 110 still executes the commands one-by-one according to the number of the commands. Therefore, the conventional method cannot effectively speed up the processing time of the commands.

SUMMARY

The disclosure provides a data transmission device including a command register and a command merging unit. The command register receives and temporary stores a plurality of original commands, wherein the original commands respectively correspond to a plurality of memory blocks. The command merging unit is coupled to the command register. When the command merging unit determines that the memory blocks of the original commands are a continuous memory block, the command merging unit merges the original commands into a merging command.

The disclosure provides a method for merging multiple commands, which includes following steps. A plurality of original commands are received from a host and are temporarily stored, wherein the original commands include a plurality of memory blocks. It is determined whether the memory blocks of the original commands are a continuous memory block. When it is determined that the memory blocks are the continuous memory block, the original commands are merged into a merging command. The merging command is transmitted to a peripheral device.

According to the above descriptions, the data transmission device between the host and the peripheral device is used to analyze a plurality of the original commands sent by the host, and determine whether the memory blocks corresponding to the original commands of the same type can be merged into a continuous memory block. When the memory blocks corresponding to the original commands are partially overlapped or connected to each other, and can be merged into one continuous memory block, the original commands are merged into a merging command according to an algorithm to process the corresponding read data or write data. In this way, the number of the commands required by the peripheral device is reduced, which effectively speeds up a processing time of the peripheral device.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
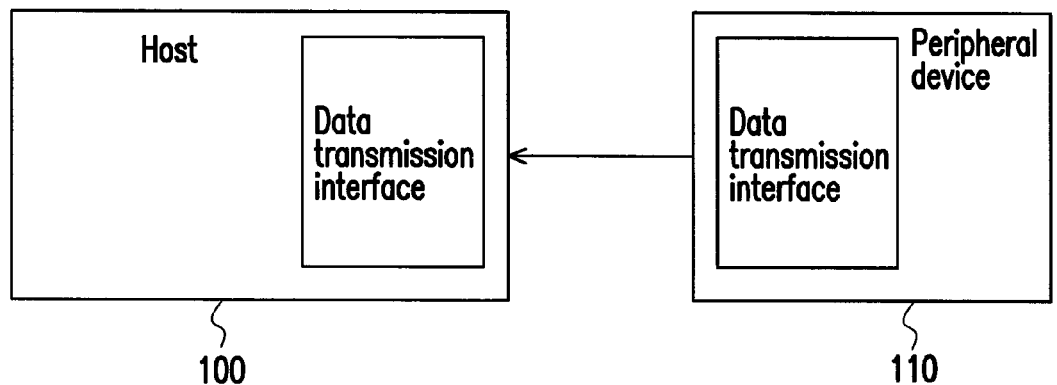
FIG. 1 is a schematic diagram illustrating a host and a peripheral device.
Figure 2:
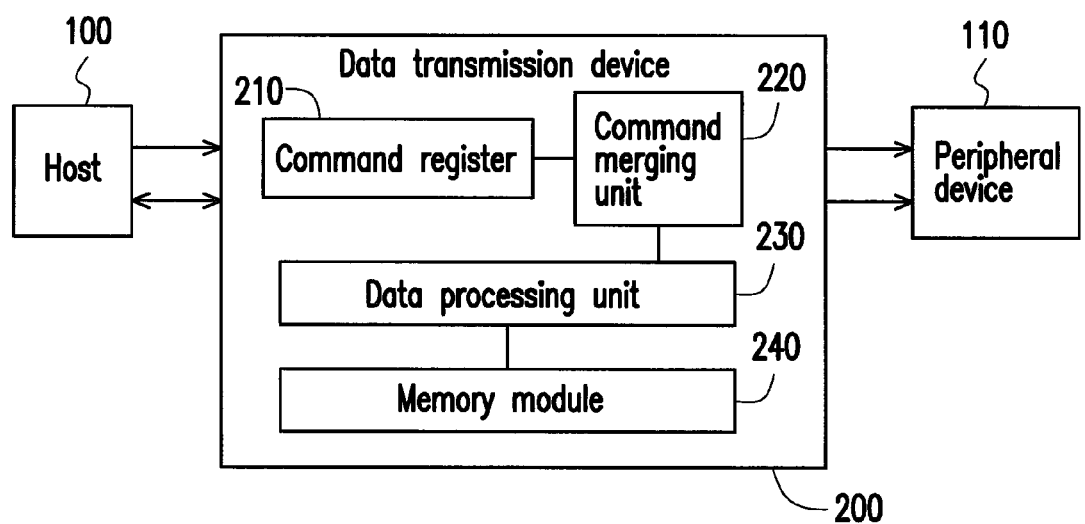
FIG. 2 is a block diagram of a data transmission device according to an embodiment of the disclosure.

FIG. 2 is a block diagram of a data transmission device 200 according to an embodiment of the disclosure. The data transmission device 200 is disposed between a host 100 and a peripheral device 110, and is used to process commands and data transmitted between the host 100 and the peripheral device 110. In the present embodiment, the data transmission device 200 can be disposed on a data transmission interface of the host 100 or the peripheral device 110, and the installation position of the data transmission device 200 is not limited by the disclosure.

The data transmission device 200 includes a command register 210 and a command merging unit 220, and the command merging unit 220 is coupled to the command register 210. The command register 210 can be a first in first out (FIFO) register. In the present embodiment, the data transmission device 200 further includes a data processing unit 230 and a memory module 240, and the memory module 240 is coupled to the data processing unit 230. The host 100 may transmit original commands to the command register 210 through a data transmission interface. The command merging unit 220 transmits a merging command to the peripheral device 110 through a data transmission interface of the same format.

Since an operating system of the host 100 often accesses the peripheral device 110 through continuous data access commands with shorter data length, the host 100 often sends a plurality of commands to the peripheral device 110, and these commands may for a queue to wait for the peripheral device 110 to process. Therefore, the data transmission device 200 of the present embodiment can analyze and merge a plurality the commands sent by the host 100 according to a method for merging multiple commands of the present embodiment, so as to reduce the number of the commands required by the peripheral device and effectively speed up a processing time of the peripheral device.

Figure 3:
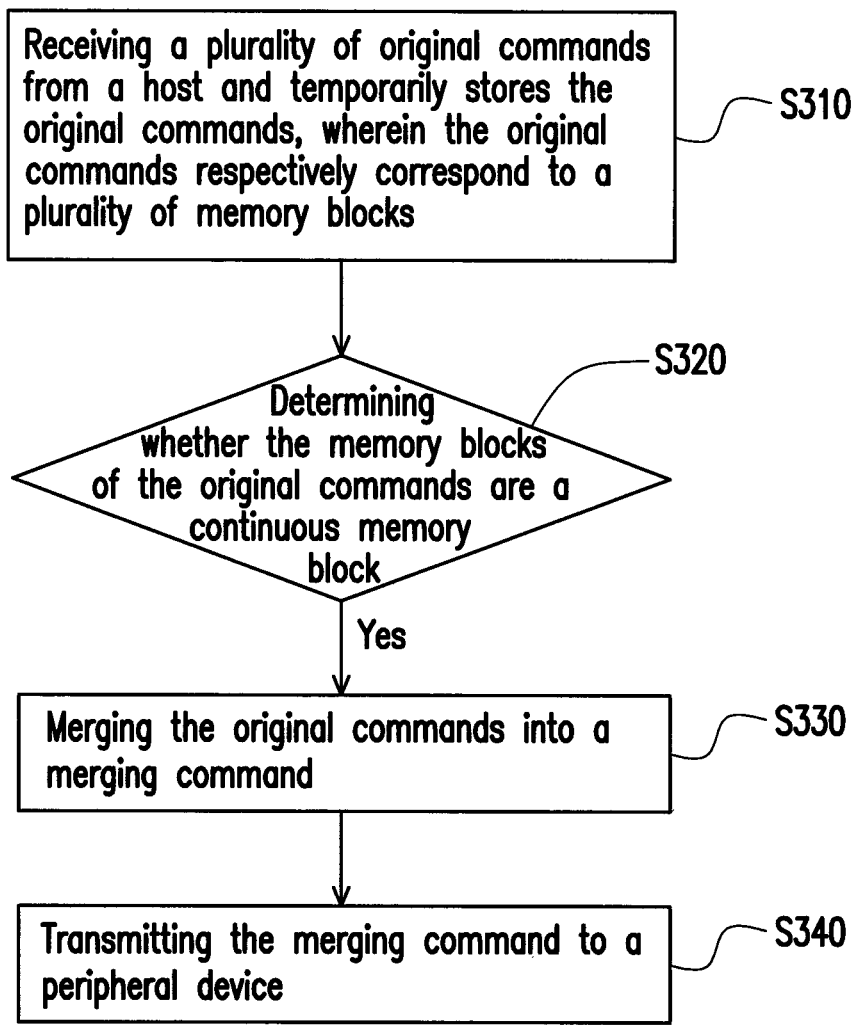
FIG. 3 is a flowchart illustrating a method for merging multiple commands according to an embodiment of the disclosure.

FIG. 3 is a flowchart illustrating a method for merging multiple commands according to an embodiment of the disclosure. Referring to FIG. 2 and FIG. 3, in step S310, the command register 210 of the data transmission device 200 sequentially receives a plurality of original commands from the host 100 and temporarily stores the original commands, where the original commands respectively correspond to a plurality of memory blocks. In the present embodiment, a content of each original command at least includes information such as an command type (for example, read or write), a start address of the memory block and a data length, etc. The start address of the memory block is, for example, a logical block address.

It should be noticed that since the start address of the memory block and the data length can be obtained from the original command, the data transmission device 200 can easily calculate the memory blocks to be processed by the command and a range of the memory blocks.

A format of the original command can be determined according to the data transmission interface used by the host 100 and the peripheral device 110. In the present embodiment, the data transmission interface is, for example, a serial advanced technology attachment (SATA), a small computer system interface (SCSI) or a universal serial bus (USB), etc., and the command formats of these data transmission interfaces all include information of the command type (for example, read or write), the start address of the memory block and the data length, etc. The type of the data transmission interface is not limited by the disclosure.

Figure 4A:
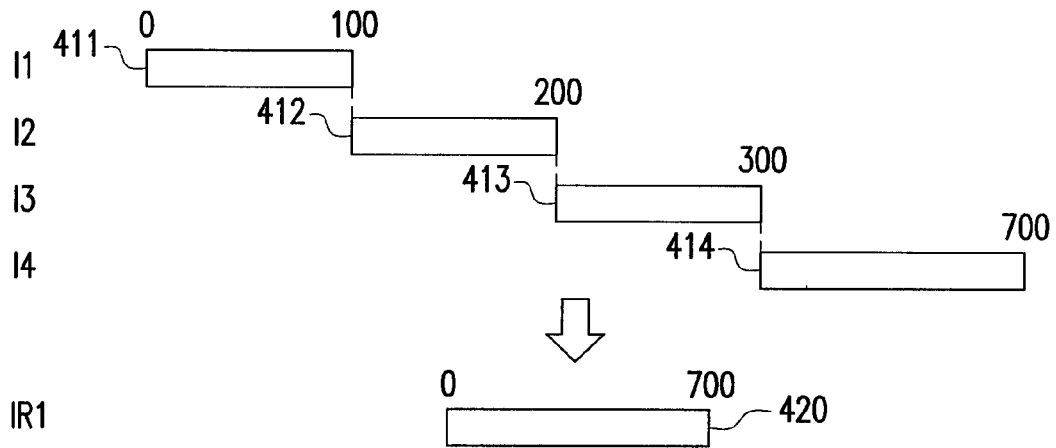
FIG. 4A and FIG. 4B are schematic diagrams illustrating memory blocks of a plurality of original commands and merging commands.
Figure 4B:
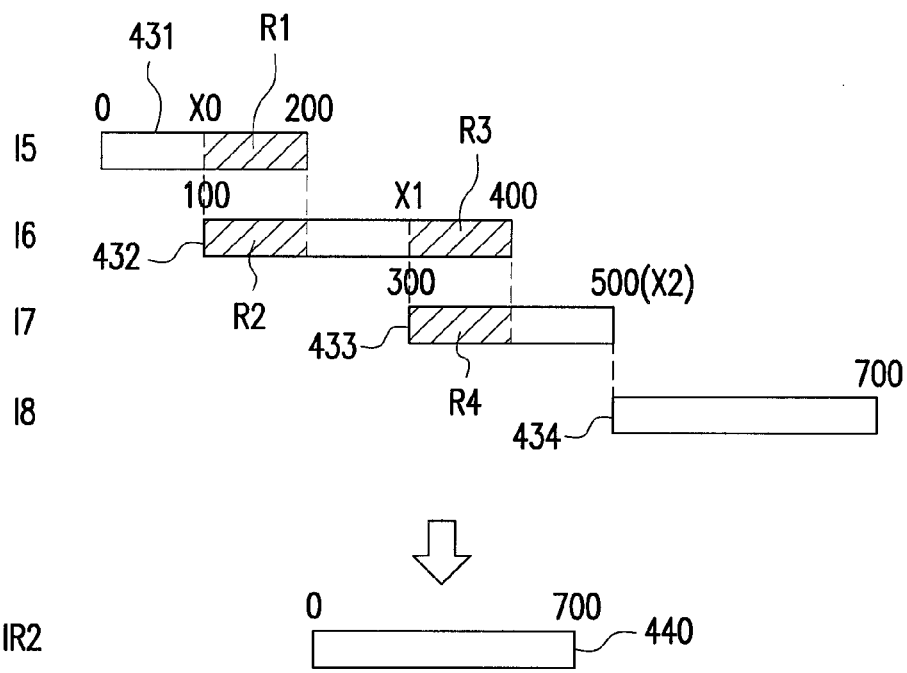

In step S320, the command merging unit 220 detects the memory blocks of the temporarily stored original commands, and determines whether the memory blocks of the original commands are a continuous memory block. Here, original commands I1-I4 and I5-I8 and memory blocks 411-414 and 431-434 thereof are provided in FIG. 4A and FIG. 4B to describe the step S320. FIG. 4A and FIG. 4B are schematic diagrams illustrating memory blocks of a plurality of original commands and merging commands. The original commands I1-I4 of FIG. 4A have the corresponding memory blocks 411-414, and the original commands I5-I8 of FIG. 4B have the corresponding memory blocks 431-434. Moreover, the original commands I1-I4 and I5-I8 have a same command type, for example, the original commands I1-I4 and I5-I8 are all write commands or read commands. The original commands I1-I4 of FIG. 4A have the continuous memory blocks 411-414 connected to each other, and the memory blocks 431-434 of the original commands I5-I8 of FIG. 4B are partially overlapped or connected to each other.

As shown in FIG. 4A, a start address of the memory block 411 of the original command I1 is "0", and a data length of the memory block 411 is 100, so that it can be calculated that an end address of the memory block 411 is "99", and the memory block 411 is represented as "0-99". Deduced by analogy, the data lengths of the memory blocks 412, 413 and 414 are respectively 100, 100 and 400, and the memory blocks 412, 413 and 414 are respectively represented as "100-199", "200-299" and "300-699".

In this way, referring to FIG. 4A and FIG. 3, in the step S320, the command merging unit 220 of FIG. 2 detects the memory blocks 411-414 of the original commands I1-I4. Moreover, since the memory blocks 411-414 are connected pairwise, the command merging unit 220 determines that the memory blocks 411-414 may consist a continuous memory block, for example, the continuous memory block 420 corresponding to a merging command IR1, which is represented as "0-699".

In this way, when the command merging unit 220 determines that the memory blocks 411-414 are the continuous memory block, a step S330 is executed, by which the command merging unit 220 merges the original commands I1-I4 into the merging command IR1.

In the implementation of FIG. 4A, the original commands I1-I4 all have the same command type, so that the merging command IR1 also has the command type the same to that of the original commands I1-I4. Moreover, as the memory blocks 411-414 are a plurality of continuous memory blocks, when the command merging unit 220 merges the original commands I1-I4 into the merging command IR1, the start address of the memory block of the merging command IR1 can be set to the start address (i.e. "0") of the first original command I1, and a value of the data length of the merging command IR1 is obtained by adding the start address (i.e. "300") of the final original command I4 with the data length (i.e. "400") of the original command I4 and subtracting the start address (i.e. "0") of the first original command I1. Namely, the value of the data length of the merging command IR1 is 700.

Moreover, referring to FIG. 4B and FIG. 3, in FIG. 4B, a start address of the memory block 431 of the original command I5 is "0", and a data length of the memory block 431 is 200, so that it can be calculated that an end address of the memory block 431 is "199", and the memory block 431 is represented as "0-199". Deduced by analogy, the start addresses of the memory blocks 432, 433 and 434 corresponding to the original commands I6, I7 and I8 are respectively 100, 300 and 500, and data lengths thereof are respectively 300, 200 and 200, so that the memory blocks 432, 433 and 434 are respectively represented as "100-399", "300-499" and "500-699".

In this way, since the memory blocks 431-434 of the original commands I5-I8 are partially overlapped pairwise (for example, overlapping portions R1 and R2 of the memory blocks 431 and 432, and overlapping portions R3 and R4 of the memory blocks 432 and 433), or are connected to each other pairwise (for example, the memory blocks 433 and 434), when the command merging unit 220 determines that the memory blocks 431-434 are a continuous memory block 440 (represented as "0-699") of a merging command IR2, and the step S330 is executed, by which the command merging unit 220 merges the original commands I5-I8 into the merging command IR2.

In the implementation of FIG. 4B, the original commands I5-I8 all have the same command type, so that the merging command IR2 also has the command type the same to that of the original commands I5-I8. Moreover, when the command merging unit 220 merges the original commands I5-I8 into the merging command IR2, the start address of the memory block of the merging command IR2 can be set to the start address (i.e. "0") of the first original command I5, and a value of the data length of the merging command IR2 is obtained by adding the start address (i.e. "500") of the final original command I8 with the data length (i.e. "200") of the original command I8 and subtracting the start address (i.e. "0") of the first original command I5. Namely, the value of the data length of the merging command IR2 is 700.

Then, in step S340 of FIG. 3, the command merging unit 220 transmits the merging command IR1 or IR2 to the peripheral device 110. Therefore, regardless of the memory blocks 411-414 connected to each other pairwise in FIG. 4A corresponding to the original commands I1-I4, or the memory blocks 431-433 partially overlapped pairwise and the memory blocks 433-434 connected to each other pairwise in FIG. 4B corresponding to the original commands I5-I8, the methods for calculating the start addresses and the data lengths of the merging commands IR1 and IR2 are the same. An only difference is how to merge and process data corresponding to the original commands I1-I4 and I5-I8 to achieve the effect of merging a plurality of commands.

As shown in FIG. 4A, if write data (in case that the original commands I1-I4 are all write commands) or read data (in case that the original commands I1-I4 are all read commands) corresponding to the original commands I1-I4 is also continuous, the data transmission device 200 is only required to directly and sequentially forward the write data from the host 100 to the peripheral device 110, or directly and sequentially forward the read data from the peripheral device 110 to the host 100, and the host 100 and the peripheral device 110 can directly use the merged merging command IR1 and the aforementioned related data to execute a related function without performing additional data process.

However, as shown in FIG. 4B, if write data (in case that the original commands I5-I8 are all write commands) or read data (in case that the original commands I5-I8 are all read commands) corresponding to the original commands I5-I8 has a part of the memory blocks overlapped to each other, the data processing unit 230 and the memory module 240 in the data transmission device 200 are used for processing.

Moreover, since the command types of the original commands are different, different processing flows are generated, and in the present embodiment, two most commonly used command types of the write command and the read command are used for descriptions, and those skilled in the art may easily deduce the other similar command types according to the above two command types.

Figure 5:
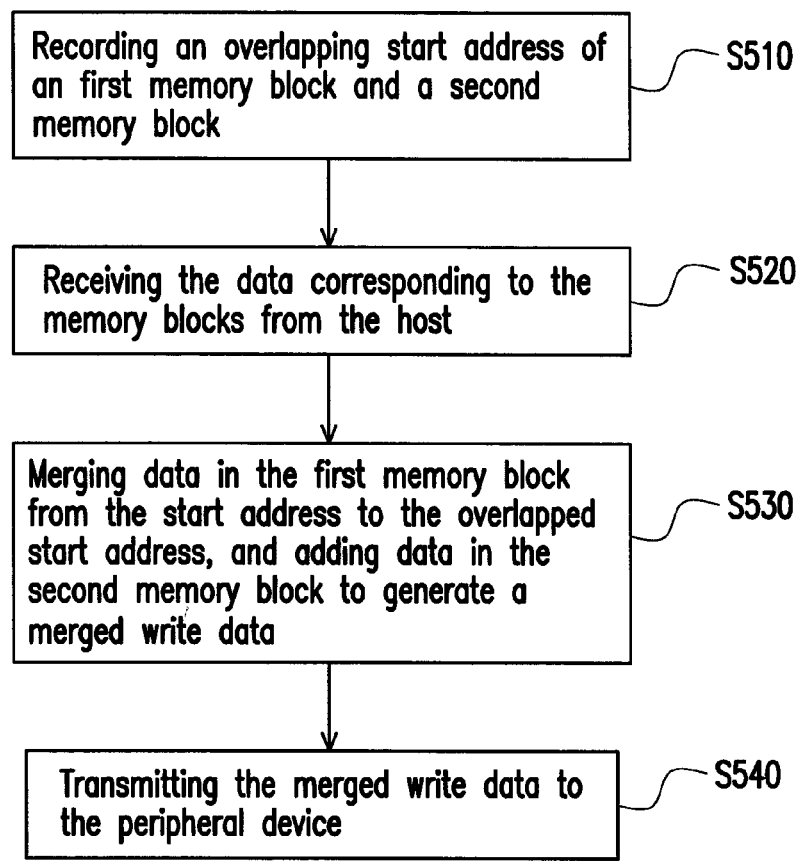
FIG. 5 is a flowchart illustrating a method for processing write data when original commands are write commands.
Figure 6:
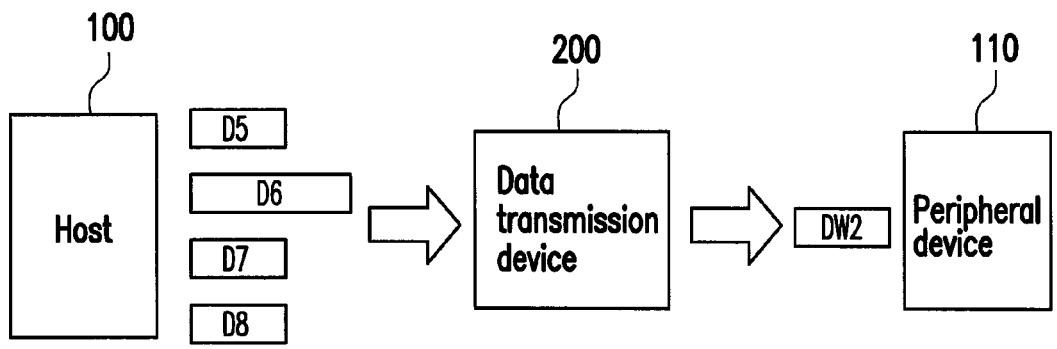
FIG. 6 is a schematic diagram illustrating a situation that a host writes a plurality of write data into a peripheral device through a data transmission device.

FIG. 5 is a flowchart illustrating a method for processing write data D5-D8 when the original commands I5-I8 are write commands, and FIG. 6 is a schematic diagram illustrating a situation that the host 100 writes the write data D5-D8 into the peripheral device 110 through the data transmission device 200.

Referring to FIG. 4B and FIG. 6, when the original commands I5-I8 of FIG. 4B are write commands, the write data D5-D8 transmitted to the data transmission device 200 by the host 100 respectively correspond to data of the memory blocks 431-434 of the original commands I5-I8. In other words, the write data D5 of FIG. 6 is data corresponding to the memory block 431 in FIG. 4B, the write data D6 of FIG. 6 is data corresponding to the memory block 432 in FIG. 4B, and the other can be deduced by analogy.

In case that the original commands I5-I8 are sequentially executed, the data written later may overwrite the data written earlier. In other words, in FIG. 4B, the data in the memory block 431 of the original command I5 is first written into the peripheral device 110, and then the data in the memory block 432 of the original command I6 is written. In this way, the overlapped memory blocks R1 and R2 and the overlapped memory blocks R3 and R4 are repeatedly written twice. Therefore, in the present embodiment, the data processing unit 230 of FIG. 2 sequentially receives the write data D5-D8 of FIG. 6, and abandons data with the memory blocks partially overlapped and transmitted earlier (for example, data in the memory block R1 and the memory block R3 of FIG. 4B), and maintains data with the memory blocks partially overlapped and transmitted later (for example, data in the memory block R2 and the memory block R4 of FIG. 4B), so as to form merged write data DW2 (FIG. 6) corresponding to the continuous memory block 440, and meanwhile sends the merged write data DW2 to the peripheral device 110. In this way, the write data D5-D8 can be merged into a same merged write data DW2 to cope with the spirit of the disclosure.

Referring to FIG. 4B, FIG. 5 and FIG. 6, in step S510, when the command merging unit 220 of FIG. 2 processes the original commands I5-I8 of FIG. 4B, it records an overlapping start address of partially overlapped portions of an first memory block and a second memory block. On the other hand, if the first memory block and the second memory block are not partially overlapped but are connected to each other, the command merging unit 220 records a start address of the second memory block to serve as the overlapped start address. For example, in FIG. 4B, the command merging unit 220 (FIG. 2) sequentially records an overlapped start address X0 (i.e. "100" shown in FIG. 4B) of the overlapped memory blocks R1 and R2 between the first memory block 431 and the second memory block 432, records an overlapped start address X1 (i.e. "300") of the overlapped memory blocks R3 and R4 between the first memory block 432 and the second memory block 433, and records an overlapped start address X2 (i.e. the start address "500" of the second memory block 434) of the first memory block 433 and the second memory block 434. In the present embodiment, the overlapped started addresses recorded by the command merging unit 220 are (X0 "100", X1 "300", X2 "500") according to the sequence of the original commands I5-I8.

In step S520, the data processing unit 220 of FIG. 2 sequentially receives the write data D5-D8 corresponding to the memory blocks 431-434 from the host 110. Moreover, in step S530, the data processing unit 230 reads the overlapped start address corresponding to each of the first memory blocks from the command merging unit 220, and sequentially merges data in the first memory block from the start address to the overlapped start address of the first memory block, and adds data in the second memory block to generate a merged write data. By repeatedly executing the above step and abandoning the overlapped data transmitted earlier, the merged write data DW2 (FIG. 6) is obtained. In the present embodiment, the data processing unit 230 (FIG. 2) sequentially merges data in the memory block 431 of FIG. 4B from the start address "0" to the overlapped start address X0 "100", data in the memory block 432 from the start address "100" to the overlapped start address X1 "300", data in the memory block 434 from the start address "300" to the overlapped start address X2 "500", and adds data corresponding to the last memory block 434 (i.e. data D8 of FIG. 6), so as to form the merged write data DW2 of FIG. 6. Then, in step S540, the data processing unit 230 transmits the merged write data DW2 to the peripheral device 110.

It should be noticed that in order to opportunely merge the write data D5-D8 of FIG. 6 and quickly transmit the processed merged write data DW2 to the peripheral device 110, the data processing unit 230 of FIG. 2 can abandon the data that is unnecessary to be repeatedly written according to the aforementioned method, and opportunely transmit the merged write data DW2. Therefore, in the present embodiment, it is unnecessary to use the memory module 240 to temporarily store the merged write data DW2.

Figure 7:
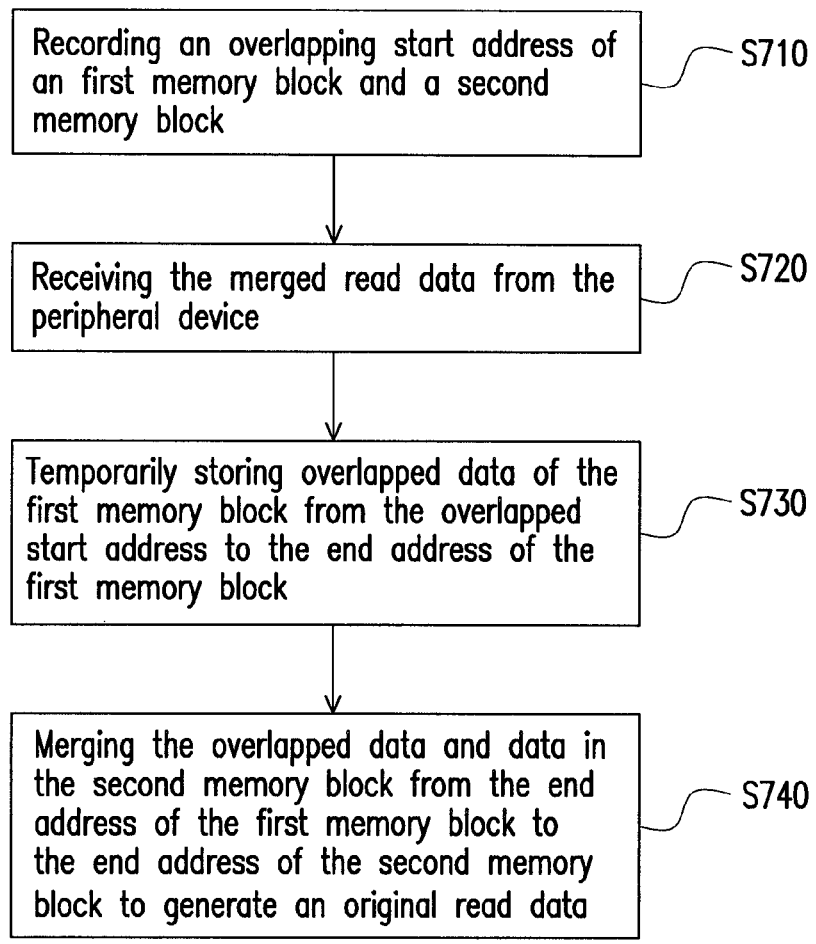
FIG. 7 is a flowchart illustrating a method for processing read data when original commands are read commands.
Figure 8:
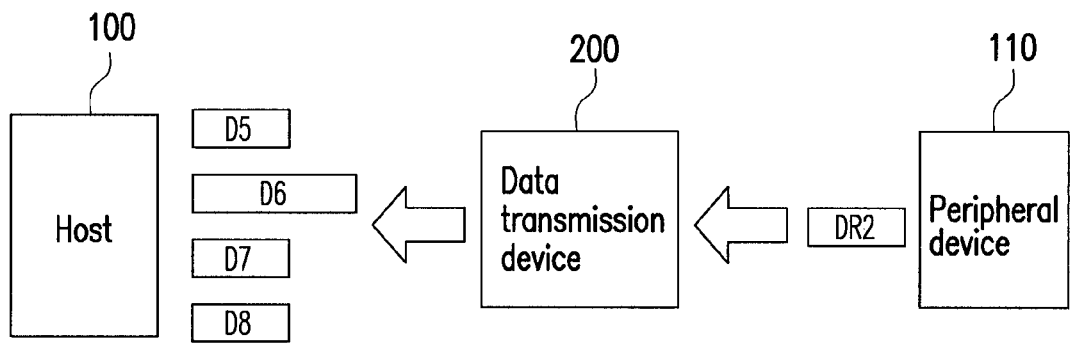
FIG. 8 is a schematic diagram illustrating a situation that a host reads read data from a peripheral device through a data transmission device.

On the other hand, FIG. 7 and FIG. 8 are provided to describe the disclosure when the original commands I5-I8 (FIG. 4B) are read commands. FIG. 7 is a flowchart illustrating a method for processing read data D5-D8 when the original commands I5-I8 are read commands, and FIG. 8 is a schematic diagram illustrating a situation that the host 100 reads the read data D5-D8 from the peripheral device 110 through the data transmission device 200.

Referring to FIG. 4B and FIG. 8, when the original commands I5-I8 of FIG. 4B are read commands, the data transmission device 200 generates and transmits the merging command IR2 to the peripheral device 110, and the peripheral device 110 receive and processes the merging command IR2, and transmits merged read data DR2 of FIG. 8 to the data transmission device 200. Therefore, the data processing unit 230 (FIG. 2) in the data transmission device 200 receives the merged read data DR2 (FIG. 8) from the peripheral device 110, and forms the read data D5-D8 corresponding to the original commands I5-I8 according to the merged read data DR2. According to FIG. 4B, it is known that since the merged read data DR2 (FIG. 8) is data of the memory block 440 corresponding to the merging command IR2 (FIG. 4B), when the read data D5-D8 corresponding to the memory blocks 431-434 are respectively formed according to the merged read data DR2, the read data D5-D8 are probably partially overlapped. Therefore, the data processing unit 230 of FIG. 2 has to respectively retransmit the data corresponding to the partially overlapped memory blocks (for example, the overlapped memory blocks R1 and R2, R3 and R4), so as to integrate the read data D5-D8. The data corresponding to the partially overlapped memory blocks are temporarily stored through mutual collaboration between the data processing unit 230 and the memory module 240.

Referring to FIG. 4B, FIG. 7 and FIG. 8, in step S710, when the command merging unit 220 of FIG. 2 processes the original commands I5-I8 of FIG. 4B, it records an overlapping start address of overlapped portions of an first memory block and a second memory block, and if the first memory block and the second memory block are not overlapped but are connected to each other, the command merging unit 220 records a start address of the second memory block. For example, the overlapped started addresses recorded by the command merging unit 220 of FIG. 2 are (X0 "100", X1 "300", X2 "500") according to the sequence of the original commands I5-I8. The step S710 is similar to the step S510 of FIG. 5, so that details thereof are not repeated.

In step S720, the data processing unit 230 of FIG. 2 sequentially receives merged read data DR2 (FIG. 8) corresponding to the merged memory block 440 (FIG. 4B) from the peripheral device 110. Then, in step S730, the data processing unit read the overlapped start address corresponding to each of the first memory blocks from the command merging unit 220, and temporarily stores overlapped data of the first memory block from the overlapped start address to the end address of the first memory block. For example, the data processing unit 230 reads the overlapped start address X0 "100" corresponding to the first memory block 431, and temporarily stores overlapped data from the overlapped start address X0 "100" to the end address "200" of the first memory block 431 into the memory module 240. In other words, the memory module 240 is used to temporarily store partially overlapped data of the above memory blocks (for example, the overlapped memory blocks R1 and R2).

In step S740, the data processing unit 230 merges the temporarily stored overlapped data and data in the second memory block from the end address of the first memory block to the end address of the second memory block to generate an original read data corresponding to the second memory block. For example, when the data processing unit 230 processes the read data D5 (FIG. 8) corresponding to the first memory block 431 (FIG. 4B), the data processing unit 230 directly puts all data corresponding to the first memory block 431 in the merged read data DR2 into the read data D5. Moreover, when the data processing unit 230 processes the read data D6 (FIG. 8) corresponding to the second memory block 432 (FIG. 4B), the data processing unit 230 merges the overlapped data temporarily stored in the step S730 (i.e. data of the overlapped memory blocks R1 and R2) and a part of data of the merged read data DR2 from the end address "200" of the first memory block 431 to the end address "400" of the second memory block 432, so as to form the read data D6 correspond to the second memory block 432 (FIG. 4B) and the original command I6. In this way, formation of the read data D7 and D8 can be deduced by analogy, and details thereof are not repeated.

Therefore, the memory module 240 of FIG. 2 can be implemented by using a random-access memory RAM and a direct memory access (DMA) controller. In some embodiments, the data transmission device 200 of FIG. 2 and the components therein can also be constructed by using digital ICs.

In summary, in the disclosure, the data transmission device between the host and the peripheral device is used to analyze a plurality of the original commands sent by the host, and determine whether the memory blocks corresponding to the original commands of the same type can be merged into a continuous memory block. When the memory blocks corresponding to the original commands are partially overlapped pairwise or connected to each other, and can be merged into one continuous memory block, the original commands are merged into a merging command according to an algorithm to process the corresponding read data or write data. In this way, the number of the commands required by the peripheral device is reduced, which effectively speeds up a processing time of the peripheral device.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A data transmission device, comprising:
   a command register, receiving and temporary storing a plurality of original commands, wherein the original commands respectively correspond to a plurality of memory blocks; and
   a command merging unit, coupled to the command register, and merging the original commands into a merging command when determining that the memory blocks of the original commands are a continuous memory block,
   wherein when the original commands are a plurality of write commands, the data transmission device further comprises
      a data processing unit, receiving data corresponding to the memory blocks, abandoning data with the memory blocks partially overlapped and transmitted earlier, and maintaining data with the memory blocks partially overlapped and transmitted later, so as to generate a merged write data corresponding to the continuous memory block, the data processing unit recording an overlapped start address of a first memory block and a second memory block, merging data in the first memory block from a start address to the overlapped start address, and adding data in the second memory block to generate the merged write data.

2. The data transmission device as claimed in claim 1, wherein the continuous memory block refers to that the memory blocks are partially overlapped.

3. The data transmission device as claimed in claim 1, wherein the continuous memory block refers to that the memory blocks are connected to each other.

4. The data transmission device as claimed in claim 1, wherein the original commands are generated by a host, and the command merging unit transmits the merging command to a peripheral device.

5. A method for merging multiple commands, comprising:
receiving a plurality of original commands from a host and temporarily storing the original commands, wherein the original commands respectively correspond to a plurality of memory blocks;
determining whether the memory blocks of the original commands are a continuous memory block;
merging the original commands into a merging command when determining that the memory blocks are the continuous memory block; and
transmitting the merging command to a peripheral device,
wherein when the original commands are a plurality of write commands, the method further comprises:
receiving data corresponding to the memory blocks from the host;
abandoning data with the memory blocks partially overlapped and transmitted earlier, and maintaining data with the memory blocks partially overlapped and transmitted later, so as to form merged write data corresponding to the continuous memory block; and
transmitting the merged write data to the peripheral device,
wherein the step of forming the merged write data corresponding to the continuous memory block comprises:
recording an overlapped start address of a first memory block and a second memory block, and
merging data in the first memory block from a start address to the overlapped start address, and adding data in the second memory block to form the merged write data.

6. The method for merging multiple commands as claimed in claim 5, wherein the step of determining whether the memory blocks of the original commands are the continuous memory block comprises:
determining whether the memory blocks are partially overlapped, so as to form the continuous memory block.

7. The method for merging multiple commands as claimed in claim 5, wherein the step of determining whether the memory blocks of the original commands are the continuous memory block comprises:
determining whether the memory blocks are connected to each other, so as to form the continuous memory block.

8. A data transmission device, comprising:
a command register, receiving and temporary storing a plurality of original commands, wherein the original commands respectively correspond to a plurality of memory blocks; and
a command merging unit, coupled to the command register, and merging the original commands into a merging command when determining that the memory blocks of the original commands are a continuous memory block,
wherein when the original commands are a plurality of read commands, the data transmission device further comprises:
a data processing unit, receiving merged read data, respectively forming a plurality of original read data corresponding to the original commands according to the merged read data, and respectively transmitting data with the memory blocks partially overlapped in the original read data; and
a memory module, coupled to the data processing unit, and temporarily storing the data with the memory blocks partially overlapped,
wherein the data processing unit records an overlapped start address of a first memory block and a second memory block, and the data processing unit temporarily stores overlapped data of the first memory block from the overlapped start address to an end address of the first memory block and merges the overlapped data and data in the second memory block from the end address of the first memory block to an end address of the second memory block, so as to form second original read data.

9. The data transmission device as claimed in claim 8, wherein the continuous memory block refers to that the memory blocks are partially overlapped.

10. The data transmission device as claimed in claim 8, wherein the continuous memory block refers to that the memory blocks are connected to each other.

11. The data transmission device as claimed in claim 8, wherein the original commands are generated by a host, and the command merging unit transmits the merging command to a peripheral device.

12. A method for merging multiple commands, comprising:
receiving a plurality of original commands from a host and temporarily storing the original commands, wherein the original commands respectively correspond to a plurality of memory blocks;
determining whether the memory blocks of the original commands are a continuous memory block;
merging the original commands into a merging command when determining that the memory blocks are the continuous memory block; and
transmitting the merging command to a peripheral device,
wherein when the original commands are a plurality of read commands, the method further comprises:
receiving the merged read data from the peripheral device; and
respectively forming a plurality of original read data corresponding to the original commands according to the merged read data, and respectively transmitting data with the memory blocks partially overlapped in the original read data,
wherein the step of respectively forming the plurality of original read data corresponding to the original commands comprises:
recording an overlapped start address of a first memory block and a second memory block;
temporarily storing overlapped data of the first memory block from the overlapped start address to an end address of the first memory block;
merging the overlapped data and data in the second memory block from the end address of the first memory block to an end address of the second memory block, so as to form second original read data; and transmitting the second original read data to the host.

13. The method for merging multiple commands as claimed in claim 12, wherein the step of determining whether the memory blocks of the original commands are the continuous memory block comprises:

determining whether the memory blocks are partially overlapped, so as to form the continuous memory block.

14. The method for merging multiple commands as claimed in claim 12, wherein the step of determining whether the memory blocks of the original commands are the continuous memory block comprises:

determining whether the memory blocks are connected to each other, so as to form the continuous memory block.

* * * * *